United States Patent [19]

Benassi

[11] 4,260,024
[45] Apr. 7, 1981

[54] DEVICE FOR LIFTING IMPLEMENTS CARRIED ON AGRICULTURAL TRACTORS

[75] Inventor: Giancarlo Benassi, Modena, Italy
[73] Assignee: Fiat Trattori S.p.A., Modena, Italy
[21] Appl. No.: 44,832
[22] Filed: Jun. 1, 1979
[30] Foreign Application Priority Data
Jul. 28, 1978 [IT] Italy .................. 68808 A/78
[51] Int. Cl.³ .......................................... A01B 63/112
[52] U.S. Cl. ..................................................... 172/12
[58] Field of Search ............... 172/7, 9, 12, 11; 280/405 B, 446 R, 446 A

[56] References Cited
U.S. PATENT DOCUMENTS

| | | | |
|---|---|---|---|
| 2,940,530 | 6/1960 | DuShane | 172/7 |
| 2,974,733 | 3/1961 | Fletcher | 172/7 |
| 3,509,943 | 5/1970 | Schowalter | 172/7 |

*Primary Examiner*—Richard T. Stouffer
*Attorney, Agent, or Firm*—Sughrue, Rothwell, Mion, Zinn & Macpeak

[57] ABSTRACT

A tractor three-point linkage has a hydraulic single-acting actuator for raising lower linkage arms through a linkage including respective vertical tie rods. A flexible compensating bar is rotatably supported by two fixed brackets on the tractor, the central region of the bar cooperating with a cam surface on a pivoted intermediate member acting through a mechanical transmission on the displaceable valve member of a distributor which controls the operation of the actuator to lift the linkage arms when the ground reaction force on the implement exceeds a limit. To increase the speed of return of the implement to the ground the invention provides for return movement of the distributor valve in response to vertical flexure of the bar caused by the weight of the implement, when lifted out of the ground, acting on the bar through the arms.

3 Claims, 3 Drawing Figures

DEVICE FOR LIFTING IMPLEMENTS CARRIED ON AGRICULTURAL TRACTORS

The present invention relates to devices for lifting implements carried on agricultural tractors, of the type comprising:

articulated linkage means for attaching an implement to an agricultural tractor, designed to allow the movement of the implement in a longitudinal vertical plane, the said linkage means including at least one pair of lower linkage arms and a pair of substantially vertical tie rods pivotally connected to the respective lower linkage arms;

a single-acting hydraulic actuator connected through a lever transmission to the said tie-rods for effecting lifting of the implement;

means for supplying hydraulic fluid to said actuator;

hydraulic distributor means, interposed between the hydraulic supply means and the actuator, for controlling the operation of said actuator, the said distributor means having a control member, movable between a rest position, in which the actuator is not supplied with pressure fluid and the implement is lowered, and a working position in which the actuator is supplied with pressure fluid to lift the implement;

a flexible transverse bar connected at its ends to the said lower linkage arms and supported on the tractor for rotation about its axis so that the reaction force transmitted from the ground to the implement, when the latter is lowered into the ground, causes deformation of said flexible bar in a substantially horizontal plane, and a mechanical transmission interposed between the flexible bar and the control member of the hydraulic distributor means, and adapted to cause movement of said control member towards its working position, so as to effect lifting of the implement, when the said reaction force and the consequent deformation of the flexible bar in the said horizontal plane exceed a predetermined value.

In devices of the aforesaid type, generally known as "controlled stress" devices, as soon as the implement carried by the tractor is lifted from the ground as a result of the reaction force on the implement exceeding the said predetermined value the said flexible bar resumes its initial configuration, causing retraction of the actuator and lowering of the implement. Such lowering, however, cannot be quick enough to allow uniform working of the ground in cases where the implement is relatively light.

The object of the present invention is to provide a device of the aforesaid type which, by simple mechanical means, enables rapid restoration of the implement to the initial working condition after lifting of the said implement has occured as a result of the aforesaid predetermined value of the ground reaction force applied to the implement being exceeded.

With the said object in view the present invention provides a device for lifting implements carried on agricultural tractors of the type specified above, characterised in that each of the said tie-rods is articulated to the respective lower linkage arm at a point such that the weight of the implement, when it is lifted from the ground, causes rotation of the lower linkage arms around their respective pivotal connections to the tie-rods, causing a deformation of the said flexible bar in a substantially vertical plane, and further characterised in that the said mechanical transmission acts upon the control member of the hydraulic distributor, upon such deformation of the flexible bar in said vertical plane, so as to return said control member to its rest position.

Preferably the mechanical transmission includes a bellcrank lever which is pivoted about a horizontal transverse axis to the fixed structure of the tractor, adjacent the central region of the flexible bar, the said bellcrank lever being connected at one end to the control member of the hydraulic distributor, said transmission further including an intermediate transmission member supported by the fixed structure of the tractor for rotation about a horizontal transverse axis and having two cam-surfaces which contact respectively the central region of the flexible bar and with the other end of the bellcrank lever, resilient means for keeping the said other end of the bellcrank lever pressed against the corresponding cam surface of the intermediate transmission member, and for keeping the other cam surface of the intermediate transmission member pressed against the central region of the flexible bar, so that a forward displacement and a downward displacement of the said central region of the flexible bar respectively cause rotations in opposite directions, of the bellcrank lever.

The said deformation of the flexible bar in a vertical plane, as a result of lifting the implement, in effect anticipates the moment at which the movable member of the hydraulic distributor returns to its rest position.

The invention will be further described, by way of example, with reference to the accompanying drawings, in which.

Figure 1:
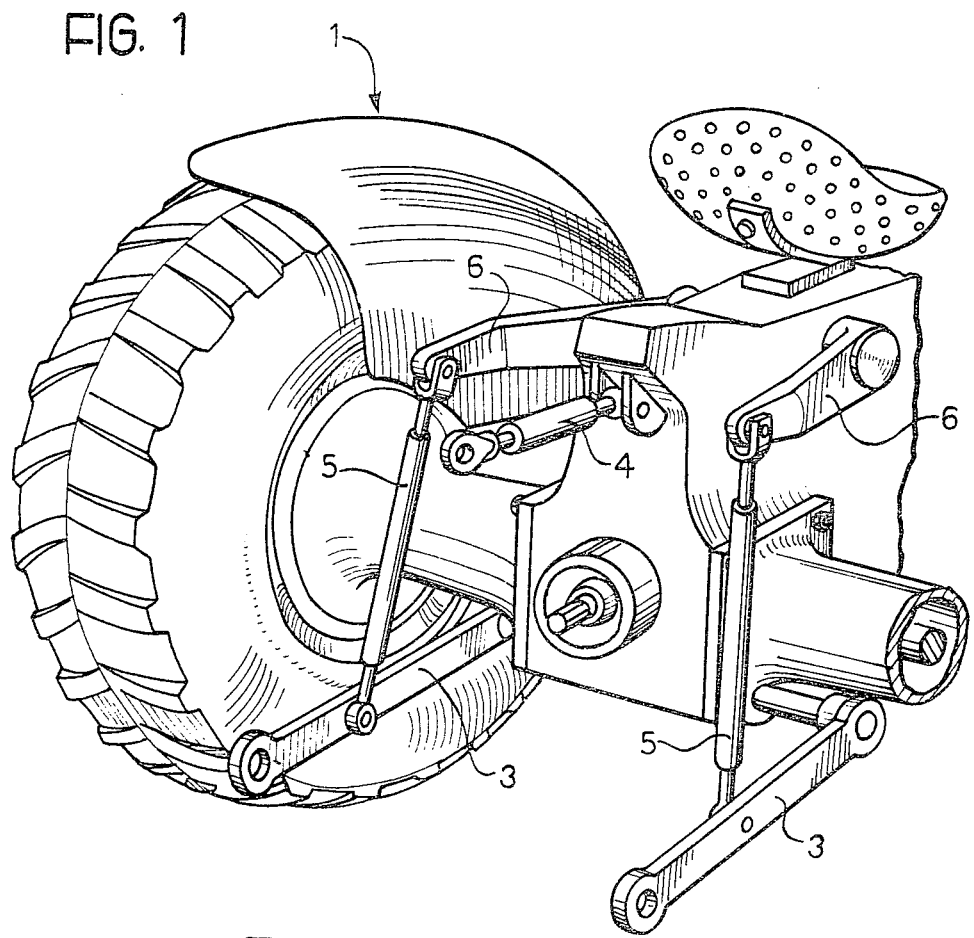
FIG. 1 is a partial perspective view of a linkage for agricultural implements, assembled on the rear of a tractor, to which a device according to the invention is applicable.
Figure 3:
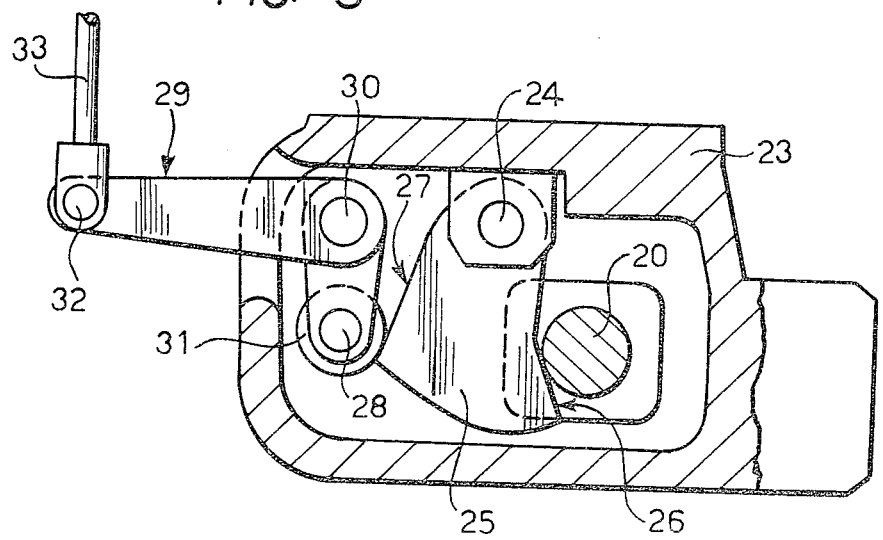
FIG. 3 is a side view, partially in section, and on an enlarged scale, of a detail of the device shown in FIG. 2.
Figure 2:
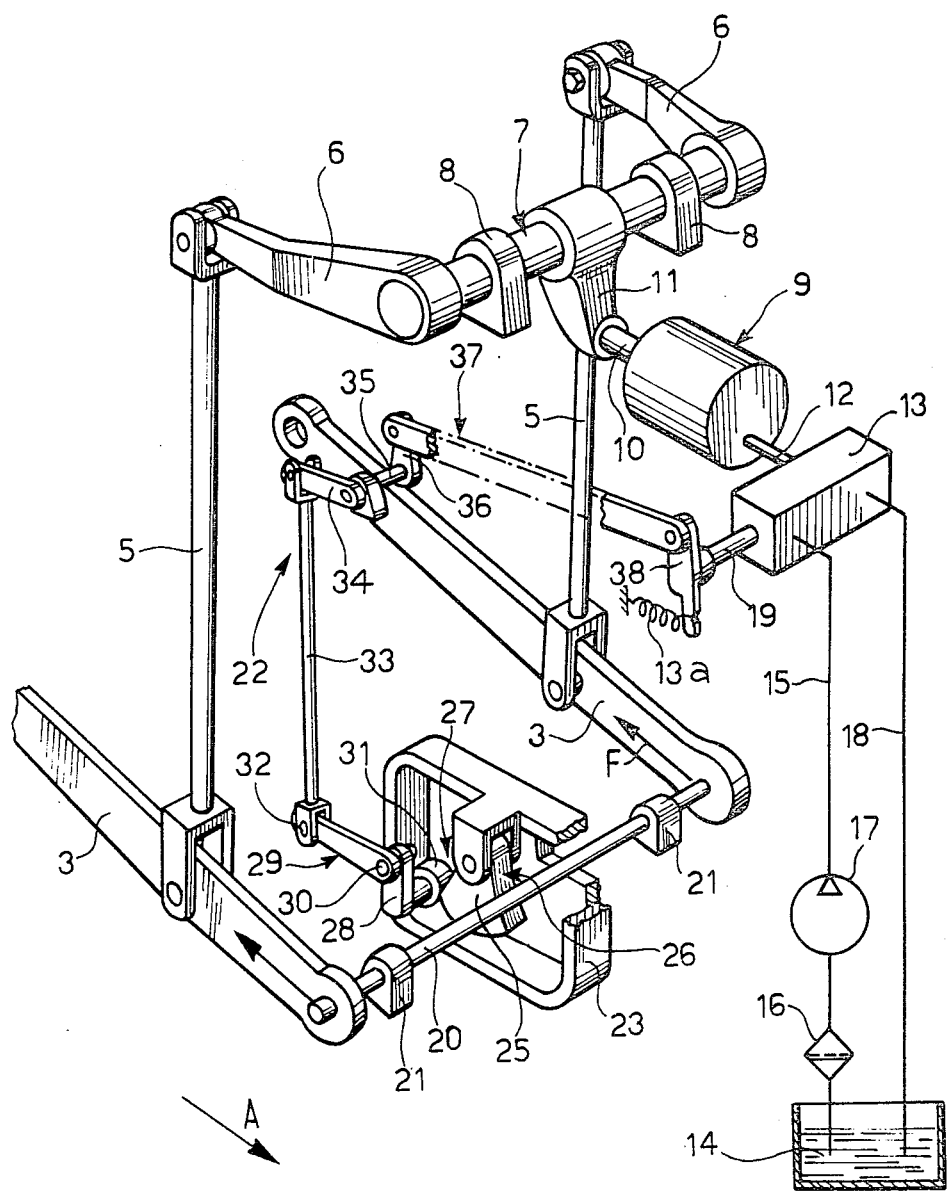
FIG. 2 shows in perspective a lifting device according to one embodiment of the invention, including a schematic hydraulic circuit.

The embodiment of the invention shown in FIGS. 1 to 3 relates to a tractor 1 having a rear linkage 2 for the attachment of agricultural implements of the type known as a "three-point" linkage. The "three-point" linkage 2 comprises two lower linkage arms 3, each connected at one of its ends to the fixed structure of the tractor 1, and a central upper link incorporating a hydraulic jack 4 which is also connected at one end to the fixed structure of the tractor 1. The free ends of the lower arms 3 and of the jack 4 are adapted to be connected to the agricultural implement to be carried by the tractor 1.

The lower arms 3 of the "three-point" linkage 2 are pivotally connected by respective tie-rods 5 to a pair of respective arms 6. The ends of the arms 6 opposite their pivotal connections to the tie-rods 5, are connected to opposite ends of a common transverse shaft 7 (FIG. 2) supported for rotation about a transverse horizontal axis by the fixed structure of the tractor 1 which includes two fixed supports 8 for the shaft 7.

In three-point linkages of the type described, lifting of an implement connected to the linkage is effected by controlled rotation of the shaft 7 to which the arms 6 are fixed so as to cause raising of the lower arms 3 by the action of the tie-rods 5.

FIG. 2 shows a single-acting hydraulic jack 9 having a piston rod 10 connected to an arm 11 fixed to the shaft 7 for controlling the rotation of the said shaft and the consequent raising of the lower linkage arms 3. The hydraulic jack 9 is connected by a pipe 12 to a hydraulic distributor 13 which is connected to a reservoir 14 via a delivery pipe 15 including a filter 16 and a pump 17, and via a return pipe 18.

The hydraulic distributor 13 has a movable control member 19 which is movable between a rest position, in which it places the delivery pipe 15 in communication, through the return pipe 18, with the reservoir 14, and a working position, in which it places the delivery pipe 15 in communication with the pipe 12, permitting the supply of pressure fluid to the hydraulic jack 9. When the distributor control member 19 is in its rest position the hydraulic jack 9 is not supplied with pressure fluid and the lifting arms 6 carried by the shaft 7 are allowed to drop, lowering the implement onto the ground. When the distributor control member 19 is in its working position, the hydraulic jack 9 is supplied with pressure fluid so as to effect lifting of the implement carried by the linkage by elevating the arms 6 and, through the tie-rods 5, the lower linkage arms 3.

In order to effect "controlled stress" operation of the lifting device, the lower arms 3 of the "three point" linkage 2 are connected to a transverse flexible bar 20, supported for rotation about a horizontal transverse axis, by means of a pair of support brackets 21 mounted on the fixed structure of the tractor 1. The flexible bar 20, being connected by the arms 3 to the implement carried by the "three-point" linkage 2 and by the supports 21 to the fixed structure of the tractor, tends to deform flexurally as the implement works the ground, as a result of the reaction force transmitted by the ground to the implement when the tractor 1 is moving forwards, in the direction of the arrow A in FIG. 2.

The flexible bar 20 is connected, by means which will be clear by the following description, to the distributor control member 19 through a mechanical transmission 22. FIG. 2 shows a simplified mechanical transmission 22, although in practice this transmission could be replaced by any other mechanical transmission for converting the flexural deformation of the bar 20 into a corresponding displacement of the control member 19. More particularly, in the example illustrated in FIG. 2, where the control member 19 comprises a distributor shaft rotatable about its axis of symmetry, the mechanical transmission 22 may be replaced by any other transmission capable of converting the deformation of the flexible bar 20 into a rotation of the control member 19.

FIG. 3 shows, on an enlarged scale, the connection between the central region of the flexible bar 20 and the mechanical transmission 22. A support 23, fixed to the structure of the tractor 1, has a transverse shaft 24 about which an intermediate transmission member 25 is pivotable. This intermediate transmission member 25 has two cam-surfaces 26, 27. The cam surface 26 of the intermediate transmission member 25 is adapted to make contact with the central region of the flexible bar 20, while the cam surface 27 is adapted to make contact with one end 28 of a bellcrank lever 29 articulated about a transverse shaft 30 to the fixed structure of the tractor 1. One end 28 of the lever 29 is provided with a rotatable cam follower roller 31 which contacts the cam surface 27 of the intermediate transmission member 25. The other end 32 of the lever 29 opposite the said end 28 is pivotally connected to one end of a link 33 (FIG. 2) the opposite end of which is pivotally connected to the free end of a crank arm 34 fixed to one end of a shaft 35 which is rotatably supported by the fixed structure of the tractor. The other end of the shaft 35 carries a crank arm 36, the free end of which is articulated to one end of a link 37 the other end of which is connected by a crank arm 38, to the rotatable control member 19 of the hydraulic distributor 13.

The hydraulic distributor 13 is provided with resilient biassing means 13a, shown diagrammatically, would in practice, be located in the housing of the distributor 13, and tends to retain the control member 19 in such a position that it acts through the mechanical transmission 22 on the lever 29, forcing the roller 31 against the cam surface 27 of the intermediate transmission member 25 and consequently keeping the cam surface 26, also, of the said member 25 in contact with the central region of the flexible bar 20.

The operation of the device illustrated in the drawings will now be described.

When the implement is working in the ground, the reaction force transmitted from the ground to the implement as a result of the forward movement of the tractor causes deformation of the flexible bar 20 in a substantially horizontal plane. The ends of the bar 20 which are connected to the lower arms 3 of the "three point" linkage 2 are in consequence subjected to two stresses, shown as F in FIG. 2 which cause deflection of the said bar. As a result of this deflection the central region of the bar 20 tends to move in a substantially horizontal plane in the direction of travel A of the tractor. That is to say, looking, for example, at FIG. 3, the central region of the flexible bar 20 moves to the right as depicted in that figure. Due to the action of the said resilient means, when this deflection occurs, the intermediate transmission member 25 is rotated in an anticlockwise rotation, looking at FIG. 3, so as to keep the cam surface 26 against the central region of the flexible bar 20; consequently, under the action of the resilient biassing means 13a, the said lever 29 also effects an anticlockwise rotation so as to keep the roller 31 on its free end 28 in contact with the cam surface 27 of the intermediate transmission member 25. The movement of the link 33 due to this anticlockwise rotation of the lever 29 causes, through the transmission made up of the elements 34, 35, 36, 37, 38, a movement of the distributor control member 19 from its rest position towards its working position. When the said reaction force transmitted from the ground to the implement exceeds a predetermined value, the control member 19 is displaced in this way into its working position; the delivery pipe 15 is then placed in communication with the pipe 12 and allows pressure fluid to be supplied to the hydraulic jack 9 to effect lifting of the implement out of the ground. As soon as the implement has been so lifted, the flexible bar 20 resumes its undeformed original state, and consequently the distributor control member 19 returns to its rest position, allowing the implement to be lowered into the ground again. In order to accelerate the re-lowering of the implement, in order to effect a sufficiently even working of the ground, the return of the control member 19 into its idle position is effected as soon as the implement carried on the tractor is lifted. Indeed, as soon as this occurs, the weight of the implement borne on the tractor "three point" linkage 2 induces a rotation of the lower linkage arms 3 about their respective pivot joints with the vertical tie-rods 5. In consequence the ends of the flexible bar 20 move upwards, tending to cause distortion of the said bar in a substantially vertical plane, and thereby lowering the central region of the flexible bar 20. This distortion of the bar 20 in the vertical plane causes the intermediate member 25 to effect a clockwise rotation, looking at FIG. 3, due to the engagement of the bar 20 with the cam surface 26. The clockwise rotation of the intermediate member 25 causes a clockwise rotation of the lever 29 about its shaft 30, due to the engagement of the cam surface 27 of the member 25 with the roller 31 carried by the free end 28 of the lever 29. The link 33 is, as a result, moved upwardly, returning the distributor control member 19 to its rest position.

As soon as the implement is lifted out of the ground, therefore, the deformation of the flexible bar 20 in the vertical plane tends to accelerate the return of the control member 19 of the hydraulic distributor 13 to its rest position, bringing about rapid relowering of the implement into the ground.

I claim:

1. Device for lifting implements carried on agricultural tractors, comprising:

articulated linkage means for attaching an implement to an agricultural tractor including at least one pair of lower linkage arms movable in a longitudinal vertical plane and a pair of substantially vertical tie-rods having respective pivotal connections to the respective lower linkage arms at points intermediate the ends of said linkage arms, a single-acting hydraulic actuator, a lever transmission connecting said actuator to said tie-rods for effecting lifting of the implement;

means for supplying hydraulic fluid to said actuator;

hydraulic distributor means, interposed between the hydraulic supply means and the actuator, for controlling the operation of said actuator, the said distributor means having a control member, movable between a rest position, in which the actuator is not supplied with pressure fluid and the implement is lowered, and a working position in which the actuator is supplied with pressure fluid to lift the implement;

a flexible transverse bar connected at its ends to the said lower linkage arms and supported on the tractor for rotation about its axis so that in use of the device the reaction force transmitted from the ground to the implement, when the latter is lowered into the ground, causes deformation of said flexible bar in a substantially horizontal plane, and a mechanical transmission interposed between the flexible bar and the control member of the hydraulic distributor means, and adapted to cause movement of said control member towards its working position, to effect lifting of the implement, when the said reaction force and the consequent deformation of the flexible bar in said horizontal plane exceeds a predetermined value;

wherein the improvement consists in that the said pivotal connections of said tie-rods to the respective lower linkage arms are such that the weight of the implement, when it is lifted from the ground exerts a moment on the lower linkage arms around said pivotal connections, causing a deformation of the said flexible bar downwardly in a substantially vertical plane, and the said mechanical transmission having means engaging said flexible bar so that downward deformation of the flexible bar in said vertical plane will cause said mechanical transmission to return said control member to its rest position.

2. Device as defined in claim 1, wherein said mechanical transmission includes a bellcrank lever which is pivoted about a horizontal transverse axis to the fixed structure of the tractor, adjacent the central region of the flexible bar, said bellcrank lever being connected at one end to the control member of the hydraulic distributor and said transmission further including an intermediate transmission member supported by the fixed structure of the tractor for rotation about a horizontal transverse axis and having two cam surfaces which contact respectively the central region of the flexible bar and the other end of the bellcrank lever, and including resilient biasing means for keeping the said other end of the bellcrank lever pressed against the corresponding cam surface of the intermediate transmission member, and for keeping the other cam surface of the intermediate transmission member pressed against the central region of the flexible bar, whereby displacement of the said central region of the flexible bar in the direction of forward movement of the tractor, and downward movement of said central region, result respectively in rotations in opposite directions of said bellcrank lever.

3. Device for lifting implements carried on agricultural tractors, comprising:

articulated linkage means for attaching an implement to an agricultural tractor including at least one pair of lower linkage arms movable in a longitudinal vertical plane and a pair of substantially vertical tie-rods having respective pivotal connections to the respective lower linkage arms at points intermediate the ends of said linkage arms, a single-acting hydraulic actuator, a lever transmission connecting said actuator to said tie-rods for effecting lifting of the implement;

means for supplying hydraulic fluid to said actuator;

hydraulic distributor means, interposed between the hydraulic supply means and the actuator, for controlling the operation of said actuator, the said distributor means having a control member, movable between a rest position, in which the actuator is not supplied with pressure fluid and the implement is lowered, and a working position in which the actuator is supplied with pressure fluid to lift the implement;

a flexible transverse bar connected at its ends to the said lower linkage arms and supported on the tractor for rotation about its axis so that in use of the device the reaction force transmitted from the ground to the implement, when the latter is lowered into the ground, causes deformation of said flexible bar in a substantially horizontal plane, and a mechanical transmission interposed between the flexible bar and the control member of the hydraulic distributor means, and adapted to cause movement of said control member towards its working position, to effect lifting of the implement, when the said reaction force and the consequent deformation of the flexible bar in said horizontal plane exceed a predetermined value;

wherein the improvement consists in that the said pivotal connections of said tie-rods to the respective lower linkage arms are such that the weight of the implement, when it is lifted from the ground, exerts a moment on the lower linkage arms around said pivotal connections, causing a deformation of the said flexible bar in a substantially vertical plane, and the said mechanical transmission acts upon the control member of the hydraulic distributor, upon such deformation of the flexible bar in said vertical plane, in a sense to return said control member to its rest position and wherein said mechanical transmission includes a bellcrank lever which is pivoted about a horizontal transverse axis to the fixed structure of the tractor, adjacent the central region of the flexible bar, said bellcrank lever being connected at one end to the control member of the hydraulic distributor and said transmission further including an intermediate transmission member supported by the fixed structure of the tractor for rotation about a horizontal transverse axis and having two cam surfaces which contact respectively the central region of the flexible bar and the other end of the bellcrank lever, and including resilient biassing means for keeping the said other end of the bellcrank lever pressed against the corresponding cam surface of the intermediate transmission member, and for keeping the other cam surface of the intermediate transmission member pressed against the central region of the flexible bar, whereby displacement of the said central region of the flexible bar in the direction of forward movement of the tractor, and downward movement of said central region, result respectively in rotations in opposite directions of said bellcrank lever.

* * * * *